F. B. SHAFER.
MILKING APPARATUS.
APPLICATION FILED SEPT. 11, 1907.
966,958.
Patented Aug. 9, 1910
4 SHEETS—SHEET 1.
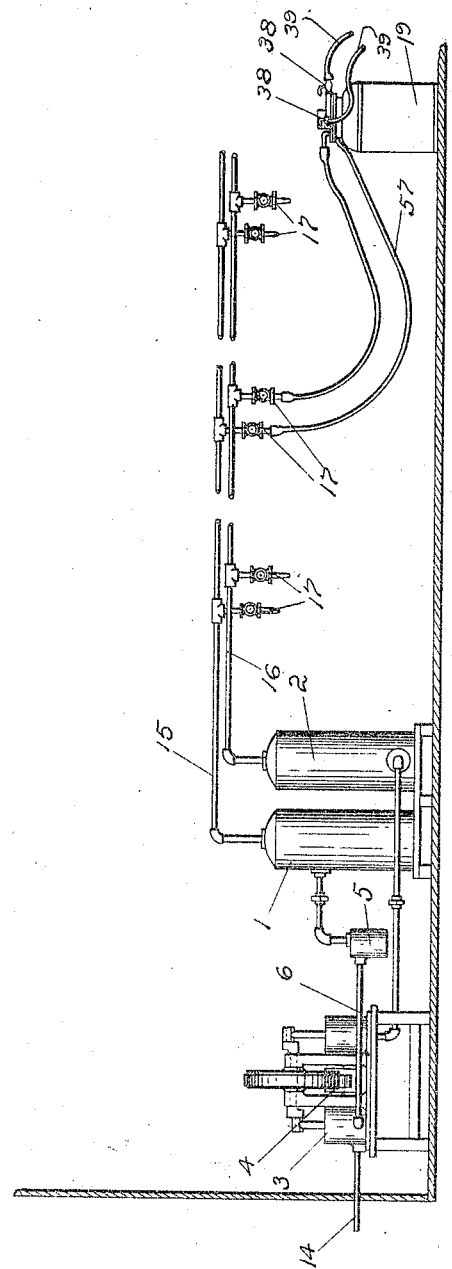
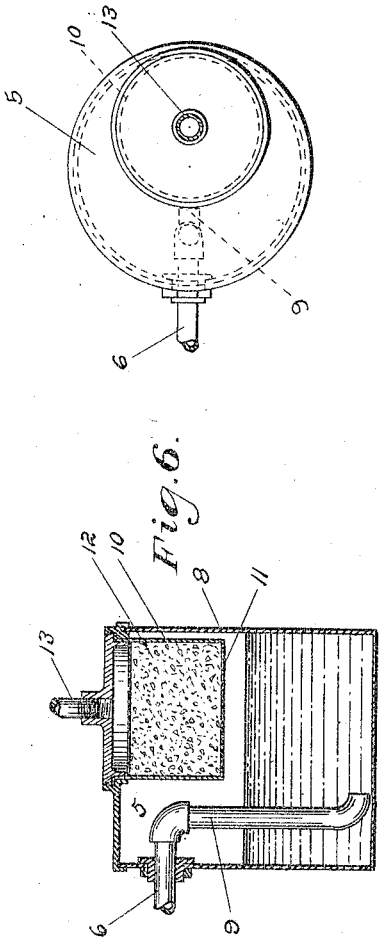
WITNESSES
Walter A. Greenburg
Anna M. Dorr
INVENTOR
FRANK B. SHAFER.
BY
ATTORNEYS F. B. SHAFER.
MILKING APPARATUS.
APPLICATION FILED SEPT. 11, 1907.
966,958.
Patented Aug. 9, 1910.
4 SHEETS—SHEET 3.
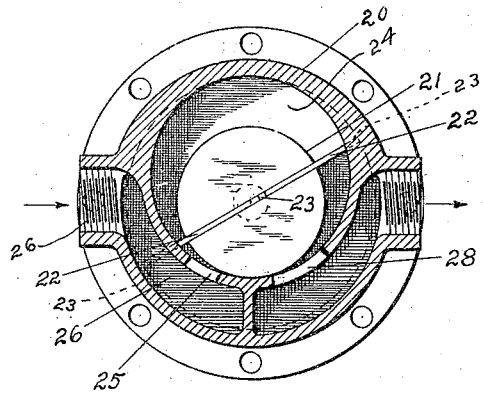
Fig. 4.
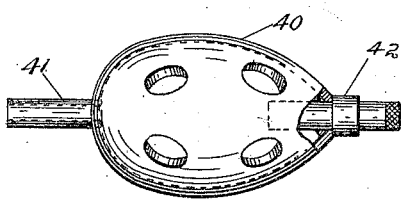
Fig. 8.
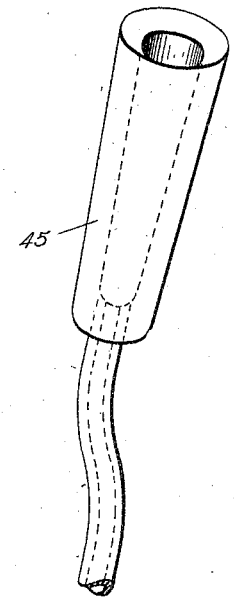
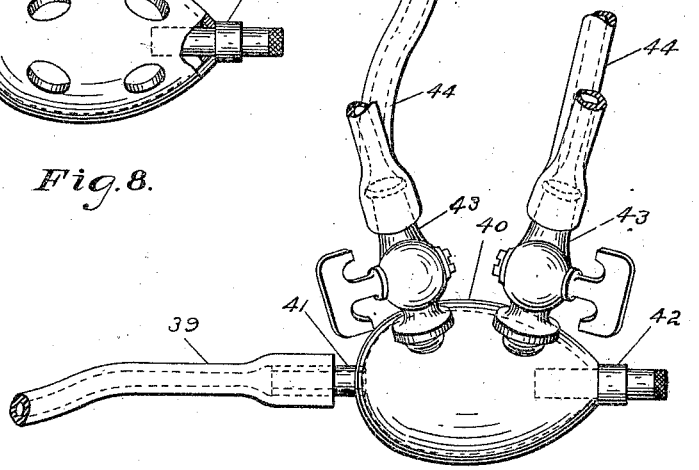
Fig. 5.
WITNESSES:
Walter A. Greenburg
A. M. Dow.
INVENTOR:
FRANK B. SHAFER.
BY
ATTORNEYS.

F. B. SHAFER.
MILKING APPARATUS.
APPLICATION FILED SEPT. 1, 1907.

966,958.

Patented Aug. 9, 1910.
4 SHEETS—SHEET 4.

WITNESSES:
Walter A. Greenburg
A. M. Dorr.

INVENTOR:
FRANK B. SHAFER.

BY
ATTORNEYS.

UNITED STATES PATENT OFFICE.

FRANK B. SHAFER, OF NORTHVILLE, MICHIGAN, ASSIGNOR TO CHARLES E. ROGERS, OF DETROIT, MICHIGAN.

MILKING APPARATUS.

966,958.  Specification of Letters Patent.   Patented Aug. 9, 1910.

Application filed September 11, 1907. Serial No. 392,265.

*To all whom it may concern:*

Be it known that I, FRANK B. SHAFER, a citizen of the United States of America, residing at Northville, in the county of Wayne and State of Michigan, have invented certain new and useful Improvements in Milking Apparatus, of which the following is a specification, reference being had therein to the accompanying drawings.

In milking apparatus the parts should be adaptable for installation in places of widely different character and arrangement, and the mechanism be as simple as possible to avoid the necessity of mechanical skill on the part of the operator to keep it in running order. It is further desirable that the action be noiseless and that the milk be kept from impurities.

This invention relates to a milking apparatus of the pneumatic pulsating type, wherein the working parts are so disposed as to be readily arranged in any building and to require no adjustments or more than ordinary attention to insure their proper operation, and wherein the milk as it enters its receptacle, is kept from contact with the atmosphere of the milking station and is aerated by washed and purified air admitted to the apparatus at a point remote from the station.

The invention consists in the matters hereinafter set forth, and more particularly pointed out in the appended claims.

Figure 2:
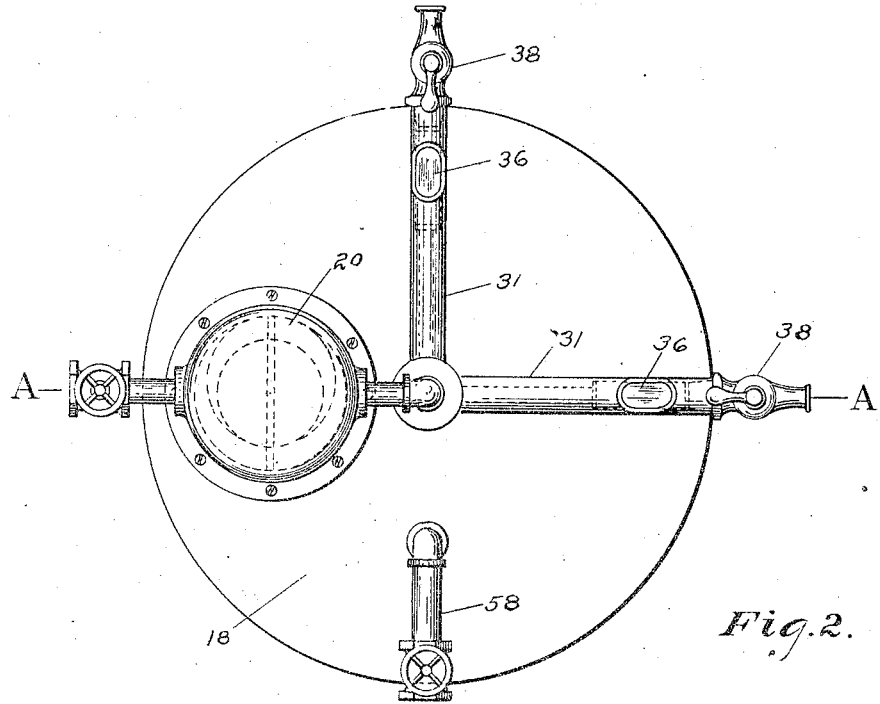
Figure 3:
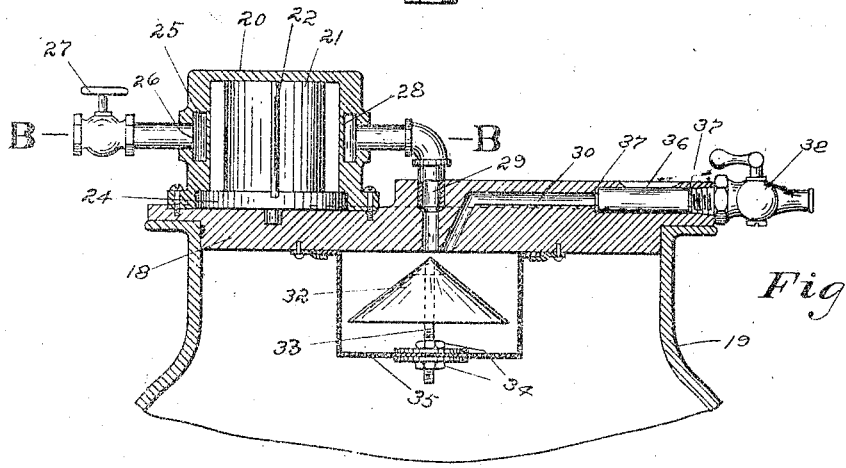
Figure 9:
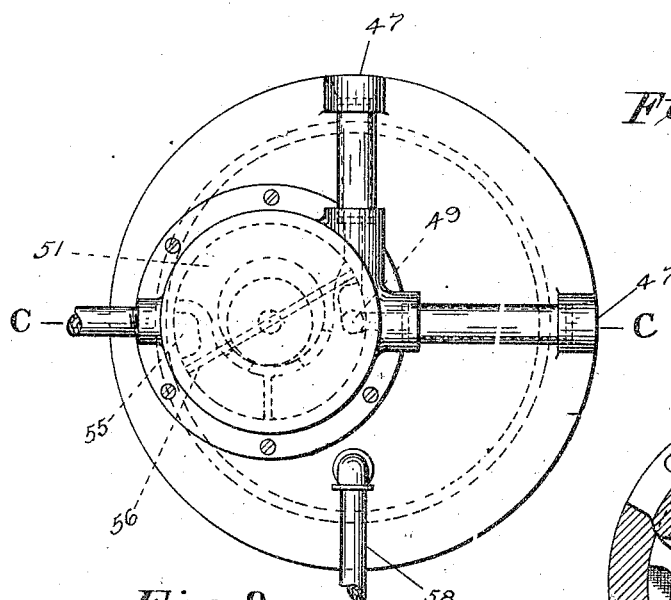
Figure 12:
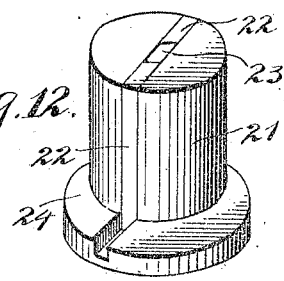
Figure 11:
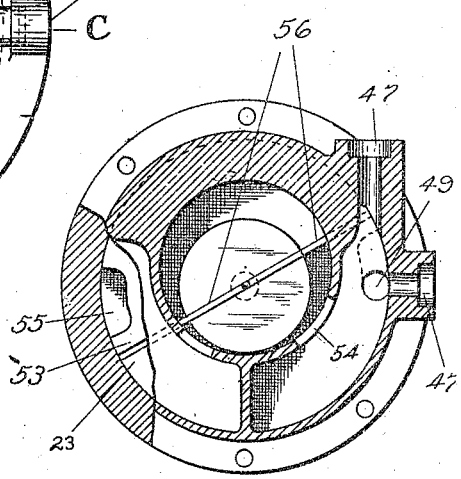
Figure 10:
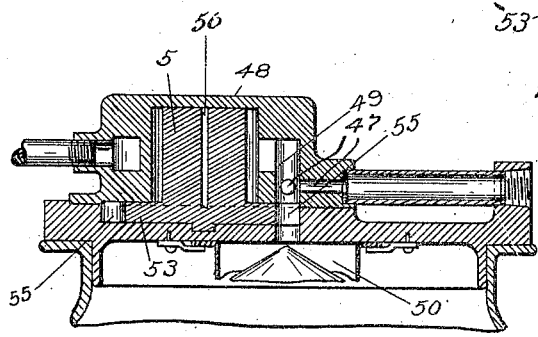
Figure 13:
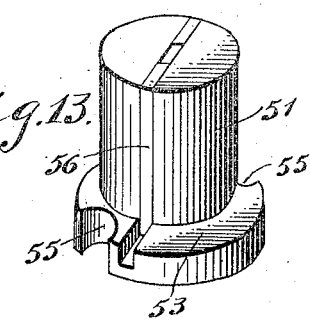

Referring to the drawings, Figure 1 is a diagrammatic view of an apparatus embodying features of the invention, showing the general arrangement and disposition of the parts. Fig. 2 is a plan view of a pulsator and aerator. Fig. 3 is a view in section on line A—A of Fig. 2. Fig. 4 is a view in section of a pulsator valve taken on or about line B—B of Fig. 3. Fig. 5 is a view in detail of a milking nipple connection. Fig. 6 is a view in longitudinal section of a form of an air sterilizer and washer. Fig. 7 is a plan view of the sterilizer. Fig. 8 is a view in detail of a multiple connection for the milking nipples. Fig. 9 is a plan view of a modified form of pulsator and aerator. Fig. 10 is a view in section on line C—C of Fig. 9. Fig. 11 is a view partially in section and partially in plan, with the casing broken away, of the valve for the modified pulsator. Fig. 12 is a perspective view of the closure shown in Figs. 3 and 4. Fig. 13 is a perspective view of a modified form of closure shown in Figs. 9, 10, and 11.

In the drawings, 1 represents a pressure tank and 2 a vacuum tank which are piped respectively to the pressure and exhaust cylinders of a double pump 3 operated by a motor 4 or any convenient means commonly used, such as continuous water vacuum inspirators or the like. An air washer, filter and sterilizer 5 of any approved type is interposed between the pressure mechanism and tank 1 in the supply pipe 6. As herein shown, this consists of an outer air tight casing 8 partially filled with water or preferred sterilizing and washing fluid into which an air inlet pipe 9 discharges, and a cage 10 set into the top of the casing, having a perforated bottom 11 supporting a filter bed 12 of any material desired, through which the air is forced into an outlet 13 in the top of the cage. The inlet 14 to the pump or the like is arranged to take air from a point remote from the milking room or station.

The pressure and vacuum tanks are each provided with pipe lines 15 and 16 which extend to the various milking stations where suitable cocks 17 are placed for temporarily connecting the pulsators and aerators.

The pulsator and aerator consists of a metal plate 18 adapted to detachably engage and seal the mouth of a milk receptacle or can 19. A valve casing 20 secured on the plate has a cylindrical counterbored chamber in which the body of a rotatable cylindrical valve closure, 21 is eccentrically journaled, having a pair of spring projected abutments 22 playing in a diametrical slot 23 that yieldingly sweep the casing wall and divide the chamber into two compartments of variable size. As a detail of construction, a flange 24 may be formed on the lower end of the body with a slot extending beyond the body into the flange so as to afford support to the abutments throughout their length beyond the body of the closure itself. An inlet port 25 in the chamber wall is connected by a duct 26 through the casing which is piped through a regulating valve 27 and a flexible tube 57 detachably secured by an adjacent connection 17 to the pressure line 15. An outlet port 28 in the chamber wall is connected to a passage 29 through the plate which discharges vertically preferably near the center.

Milk passages 30, of any desired number, preferably formed in ribs 31 cast upon the plate, extend from the periphery so as to discharge vertically onto a distributing cone 32 supported on a stem 33 secured as by jam nuts 34 on the bottom of a strainer 35 of wire gauze or perforated metal attached at its upper end to the underside of the plate 18. The outer portions of the ducts are counterbored and the wall cut away to receive glasses 36 which may conveniently be secured therein between gaskets 37 by valves 38 screw-threaded into the outer ends and connected by flexible tubing 39 with a multiple connection. The latter preferably consists of an oval casing 40 having a tube receiving nipple 41 at one end and a plug 42 at the other frictionally engaged so as to be readily removed for cleaning purposes. Stop-cocks 43 are secured in the casing and are connected by short flexible tubes 44 with elongated nipples 45 which are slightly collapsible under pressure and are adapted to close over the teats of an animal. The receptacle is connected to the vacuum tank 2 of the system through an exhaust 58 in the plate 18 properly fitted for the usual pipe or hose connections.

In operation, the plate is placed on a can and connected with the pressure and vacuum pipes as described and with the nipples adjusted. Thereafter the operator, by opening the regulator valve after the can is exhausted, and admitting the compressed air to the pulsator chamber, causes the valve closure to revolve, and thereby intermittently admit small quantities of air into the receptacle, thus periodically overcoming the vacuum otherwise maintained in the receptacle and nipples by the exhaust limb of the system. This insures the proper action of the nipples and the delivery of the milk through the view tubes, when it may be observed, into the aerating cone. The resultant film is thoroughly aerated by the blasts of air forced from without the milking room or station and washed, cooled and sterilized as shown. Thus the milk is delivered through the strainer ready for the dairy.

One of the features of the invention is the adaptability and adjustability of the apparatus for any place, as the proper arrangement of the main line piping is all that is necessary to meet any requirement of service.

Another feature is the purification, cooling and aerating of the milk as delivered, by air which is drawn from without the place where the animals are being milked, thus effectually preventing any absorption of objectionable odors, while the bulk of the portable parts is not increased.

A further and important feature is the positive, automatic action of the pulsator, and its instantaneous response when the regulator valve is opened, without the use of mechanism to operate the closure, the disposition of the ports preventing the closure from becoming set on a "dead center." The single rotating member is completely housed and shielded from dirt, requires no adjustment when once operatively mounted, and is noiseless in action. The regulator valve controls it absolutely and its speed is readily varied thereby. There is no external mechanism whatever and the sharpness and regularity of the pulsations obtained insures the proper action of the nipples.

Where the system is extensive, the work on the compressor and vacuum pumps may be lessened by introducing the compressed air directly to each pipe leading from the nipples to the pulsator, by arranging the parts as indicated in Figs. 9, 10 and 11. Lateral milk passages 47 are formed in suitable lugs in the air valve casing 48 which meet at a central vertical duct 49 discharging through the plate into the deflector and aerating strainer 50. The casing is counterbored and fitted with a closure 51 and abutments 56 as in the first construction, but the flange 53 of the closure is extended so as to cut off the duct 49 at the same time that the abutments are admitting compressed air through a discharge 54 into the milk passages, and periodically open the duct 49 at other lines, this being effected by cutting gains or ports 55 in the margin of the flange 53 in proper timed relation to the abutments 52 and their ports. Thus the space in which the vacuum is to be relieved requires a less amount of compressed air and less work of the vacuum pump to obtain proper results.

Obviously other changes in the details of construction may be made without departing from the spirit of the invention and I do not care to limit myself to any particular form or arrangement of parts.

What I claim as my invention is:—

1. In a pneumatic milking apparatus, a milk receptacle, milking nipples having a milk discharge inlet to the receptacle, a deflector opposing the inlet, and an air valve automatically directing jets of air at intervals against the deflector into the receptacle.

2. In a pneumatic milking apparatus, a milk receptacle, and a combined pulsator and aerator therefor having a milk inlet, an aerating chamber consisting of a deflector opposing the inlet and a perforated cage surrounding the deflector and inlet, and an automatic air valve adapted to intermittently admit jets of air to the receptacle having an outlet within the cage opposed by the deflector.

3. In a pneumatic milking apparatus, a milk receptacle, and an automatic pulsating valve therefor consisting of a casing adapted to detachably engage and close the receptacle and provided with, a cylindrical chamber that has, an inlet terminating in a supply port in the chamber wall and with an outlet from the chamber extending from an exhaust port in the chamber wall, a cylindrical closure eccentrically journaled in the chamber between the ports, and abutments movably secured in the closure yieldingly sweeping the chamber wall.

4. In a pneumatic milking apparatus, a milk receptacle and an automatic pulsating valve therefor consisting of a casing adapted to detachably engage and close the receptacle provided with a cylindrical chamber that has an inlet terminating in a supply port in the chamber wall and an outlet from the chamber from an exhaust port in the chamber wall, a cylindrical closure eccentrically journaled in the chamber in tangential contact with the chamber wall between the ports, and diametrically disposed spring projected abutments in the closure bearing against the periphery of the chamber.

5. In a pneumatic milking apparatus, an automatic valve for admitting air intermittently to the milk receptacle of the apparatus comprising a cylindrically chambered casing having an inlet port and an outlet port in the peripheral wall of the chamber, and also a duct through the casing to the inlet port, and also a duct from the outlet port discharging into the receptacle, a cylindrical closure eccentrically journaled in the casing, a peripheral flange on the closure, and a pair of abutments movably secured in a diametrical slot through the closure and flange, yieldingly projected against the peripheral wall of the chamber.

6. In a pneumatic milking apparatus, a milk receptacle, a base plate detachably engaging and sealing the receptacle, and provided with milk ducts from the periphery of the plate discharging downwardly near the center thereof, view glasses inserted therein, a cylindrically chambered valve casing secured on the plate, and provided with an air inlet duct through the casing terminating in a port in the peripheral wall of the casing, and provided with a discharge port in the peripheral wall, and an air outlet duct from the discharge port discharging through the plate in proximity to the milk duct outlets, a foraminous cage secured to the underside of the plate encircling the air and milk inlets, a conical deflector in the cage opposing said inlets, a rotatable eccentrically disposed closure in the valve casing chamber adapted to intermittently open the ports and a manually operated controlling valve for the air inlet to the casing.

7. In a pneumatic milking apparatus, a milk receptacle, and an automatic pulsating valve therefor consisting of a casing adapted to detachably engage and close the receptacle and provided with a cylindrical chamber having an inlet terminating in a supply port in the chamber wall and an outlet from the chamber from an exhaust port in the chamber wall, a cylindrical closure eccentrically journaled in the chamber between the ports, abutments movably secured in the closure yieldingly sweeping the chamber wall, said casing being provided with milk passages through the casing wall opening into the air outlet, and a flange on the closure adapted to close the air outlet below the milk passages in timed relation to the opening of the exhaust port.

In testimony whereof I affix my signature in presence of two witnesses.

FRANK B. SHAFER.

Witnesses:
C. R. STICKNEY,
A. M. DORR.